(12) United States Patent
Braddy et al.

(10) Patent No.: US 10,970,236 B2
(45) Date of Patent: Apr. 6, 2021

(54) SYSTEM AND METHOD FOR OPTIMIZED INPUT/OUTPUT TO AN OBJECT STORAGE SYSTEM

(71) Applicant: SOFTNAS OPERATING INC., Houston, TX (US)

(72) Inventors: Rick Gene Braddy, Houston, TX (US); Eric Olson, Melbourne, FL (US); Pasqualino Ferrentino, Asti At (IT); Kash Pande, Kincardine (CA); Albert Lee, Manhattan, KS (US)

(73) Assignee: SOFTNAS OPERATING INC., Houston, TX (US)

( * ) Notice: Subject to any disclaimer, the term of this patent is extended or adjusted under 35 U.S.C. 154(b) by 0 days.

(21) Appl. No.: 15/959,116

(22) Filed: Apr. 20, 2018

(65) Prior Publication Data

US 2018/0307631 A1 Oct. 25, 2018

Related U.S. Application Data (60) Provisional application No. 62/488,314, filed on Apr. 21, 2017.

(51) Int. Cl.
*G06F 13/16* (2006.01)
*H04L 29/08* (2006.01)
*H04L 29/12* (2006.01)

(52) U.S. Cl.
CPC ...... *G06F 13/1668* (2013.01); *H04L 67/1097* (2013.01); *H04L 61/1511* (2013.01); *H04L 67/06* (2013.01); *H04L 69/322* (2013.01)

(58) Field of Classification Search
USPC ...................................... 710/52–61
See application file for complete search history.

(56) References Cited

U.S. PATENT DOCUMENTS

| | | | |
|---|---|---|---|
| 2003/0110332 A1* | 6/2003 | Suzuki | H04N 21/42646 710/60 |
| 2010/0228878 A1* | 9/2010 | Xu | G06F 9/544 709/233 |
| 2010/0332401 A1* | 12/2010 | Prahlad | G06F 3/0649 705/80 |
| 2013/0155858 A1* | 6/2013 | Chen | H04L 47/10 370/235 |
| 2016/0020782 A1* | 1/2016 | Ruff | H03M 7/14 341/95 |
| 2016/0291883 A1* | 10/2016 | Manohar | G06F 3/0613 |
| 2017/0220592 A1* | 8/2017 | Foltz | G06F 3/0613 |
| 2017/0249331 A1* | 8/2017 | Yammine | G06F 11/1448 |
| 2017/0357596 A1* | 12/2017 | Moyer | G06F 12/121 |
| 2020/0151095 A1* | 5/2020 | Anderson | G06F 13/1673 |

* cited by examiner

*Primary Examiner* — Ilwoo Park
(74) *Attorney, Agent, or Firm* — Polsinelli PC (57) ABSTRACT

Disclosed are systems, methods and computer readable mediums for optimized throughput of an object based storage system. The systems, methods and computer readable mediums including receiving an I/O request to the storage system, determining a busy ratio based on a number of blocks available in a local cache and a queue size, determining an I/O speed to the storage system, the I/O speed based at least in part on the busy ratio and an upload speed, wherein the I/O speed does not exceed a current speed of the storage system, and executing the I/O request to the storage system at the I/O speed.

16 Claims, 6 Drawing Sheets

SYSTEM AND METHOD FOR OPTIMIZED INPUT/OUTPUT TO AN OBJECT STORAGE SYSTEM

CROSS-REFERENCE TO RELATED APPLICATIONS

This application claims priority to U.S. provisional application No. 62/488,314, which is hereby incorporated by reference in its entirety.

TECHNICAL FIELD

The present technology pertains to data storage, and more specifically to the storing and use of data in a cloud hosted environment.

BACKGROUND

Many cloud based services provide "as needed" storage and compute capacity. Often, the fee associated with storage or compute varies based on the amount of compute or storage needed at a given time. Furthermore, many cloud storage solutions throttle input/output (I/O), or read/write, functionality based on any or all of the volume of data stored, the rate at which data is read from cloud storage, the rate at which data is written to cloud storage, and the like. It can be difficult to predict throttling because the exact threshold values can not be provided by the cloud services vendor or the threshold values can be dynamically adjusted by the cloud vendor in order to balance load across the vendor infrastructure. It is with these observations in mind, among others, that various aspects of the present disclosure were conceived.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention can be practiced without these specific details. In other instances, well-known methods, procedures, components, circuits, and networks have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in response to detecting," depending on the context. Similarly, the phrase "if it is determined" or "if [a stated condition or event] is detected" can be construed to mean "upon determining" or "in response to determining" or "upon detecting [the stated condition or event]" or "in response to detecting [the stated condition or event]," depending on the context.

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is an optimal flow control for I/O (input/output) to an object storage system (e.g., Azure Blobs, AWS S3, etc.), whereby the object storage system can receive data at a certain rate, based upon how busy the object storage system is at a given point in time. The object storage system can return a "slow down" error code—specifying that data cannot be processed at this time. Write operations will then be delayed a specific amount of time, before they are retried. In order to avoid the "slow down" error code, the object storage system can anticipate the maximum ingest rate that is possible before reaching an error threshold (and having to retry any failed writes). Retries can be detrimental to the system as they can introduce latencies into the low-level block storage data path. In some cases, if enough retries stack up and the I/O attempt fails, the system can simulate a disk offline event (and/or become unusable). The simulated disk offline event can cause upstream filesystems to appear to lock up or otherwise become unresponsive due to the upstream filesystems waiting on the nonresponsive underlying block storage. Once an error occurs, it could potentially result in data loss. For example, should a power failure or other event occur during an extended retry period, some or all of data (stored in cache-type memory) awaiting to be written to the object storage system can be lost.

Figure 1:
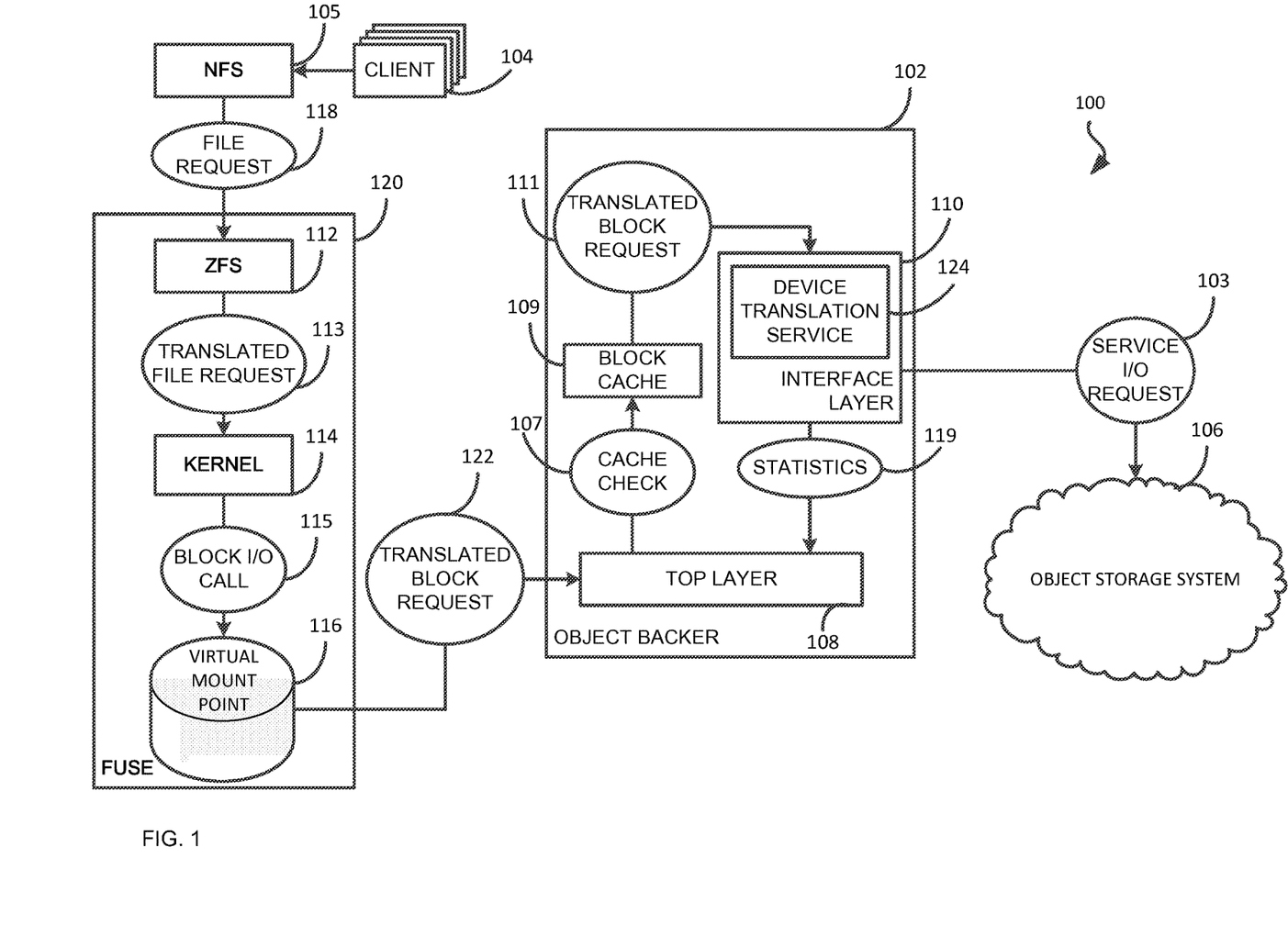
FIG. 1 is a block diagram illustrating an example system for optimizing I/O from one or more clients to a cloud storage system.

FIG. 1 is a block diagram illustrating example system 100 for optimizing I/O from one or more clients 104 to a cloud storage system. Object backer 102 (e.g., virtual loopback device, s3backer, etc.) uploads blocks of a virtual device to object storage system 106 (e.g., cloud storage system, Amazon S3, Azure BLOB, etc.). Object backer 102 can be a virtual loopback device on top of a filesystem (e.g., S3 filesystem). Object backer 102 can include several software layers, each software layer can have a task (e.g., caching, checking that data is not corrupt, and the like). File request 118 from one or more clients 104 can be processed by a filesystem in userspace ("FUSE") system 120 before being provided to object backer 102 as translated block request 122.

In some examples, clients 104 can interact with FUSE system 120 via network file system ("NFS") 105. NFS 105 can enable multiple clients 104 to simultaneously interact with system 100. In some examples, NFS 105 can further enable clients 104 to remotely access and interact with system 100, as will be understood by those having ordinary skill in the art. Nevertheless, once file request 118 is received by FUSE system 120, components included in FUSE system 120 can process file request 118.

In some examples, FUSE system 120 can include ZFS file system 112. ZFS file system 112 can itself include both a file system and a volume management system, as will be understood by a person having ordinary skill in the art. ZFS file system 112 can provide a translated file request 113 to kernel 114, thereby enabling clients 104 to interact with data (e.g., files and the like) of system 100 without needing to directly interface with kernel 114. In some examples, such abstracting away of kernel operations from clients 104 provides increased security and data protection measures, as will be apparent to a person having ordinary skill in the art. In response to receving translated file request 113, kernel 114 can provide block I/O call 115 to virtual mount point 116.

Virtual mount point 116 provides an access point between FUSE system 120 and object backer 102, which can be provided on the same local device as FUSE system 120, be remotely accessed over a network (e.g., LAN, VPN, the Internet, and the like), or be provided as a combination of the two. Object backer 102 can process data as blocks, sometimes called buckets, of grouped data. In some examples, translated block request 122 can direct object backer 102 to access data otherwise indicated by file request 118 but in a block-formatted manner.

Object backer 102 can first receive translated block request 122 at top layer 108. Top layer 108 can act as any or all of a data filter, service dispatcher, and the like. Furthermore, top layer 108 can include an enforceable delay which is computed by interface layer 110. Interface layer 110 can collect statistics 119 regarding the speed at which data is received by object storage system 106. Statistics 119 can then be fed back to top layer 108 in order to match (e.g., approximately) the speed at which data is collected by cloud storage system 106 to a rate of data which enters object backer 102. In some examples, top layer 108 can use this information in an averaged manner. The top layer can recognize how many bytes are sent by clients 104 and can create a delay for each client based on the respective number of bytes sent by that client. Furthermore, the delay can grow until a certain delay size threshold is reached or exceeded. For example, a delay size threshold could be 25 milliseconds. However, the delay size threshold can be configurable by an administrator, object backer 102, or both.

Object backer 102 can include top layer 108 for receiving translated a block request 122 from FUSE system 120, interface layer 110 for transmitting service I/O request 103 to object storage system 106, and block cache 109 for processing data between top layer 108 and interface layer 110. Top layer 108 can transmit a cache check to block cache 109 in order to check whether translated block request 122 has been previously uploaded to cloud storage system 106 as well as to verify data integrity by evaluating, for example and without imputing limitation, checksum values and the like. In some examples, top layer 108 can return a value from block cache 109 back to FUSE system 120 in order to reduce the number of read (e.g., "GET") requests transmitted to object storage system 106. In cases where a high volume of read requests are processed and cloud storage system 106 exacts a fee charge per read request, any reduction in processed read requests can greatly reduce the total cost of object storage system 106 to, clients 104, for example.

Interface layer 110 can include device translation service 124. Device translation service 124 can receive I/O requests passed to interface layer 110 and convert them into an appropriate device dependent protocol associated with object storage system 106. For example, device translation service 124 can receive translated block request 111, which can be device independent as received. Device translation service 124 can execute various libraries, APIs, and the like associated with object storage system 106 to convert the device independent translated block request 111 to an I/O request conformant to device dependent protocols. As a result, service I/O request 103 will conform to object storage system 106 protocols. In some examples, the protocol translator servicebe associated with dynamically loaded as a shared dynamically-linked library ("DLL"), statically linked, or a combination of the two.

Figure 2:
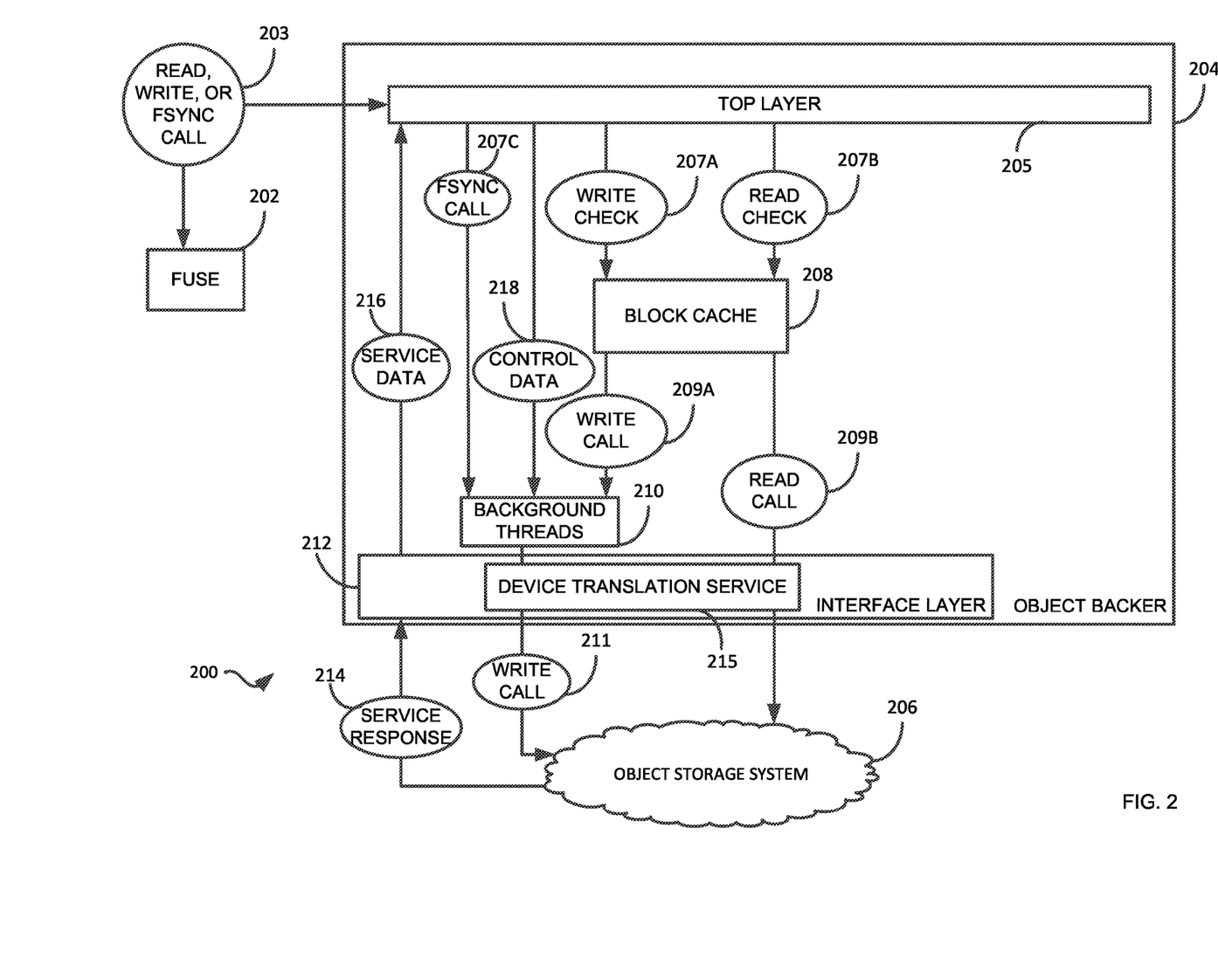
FIG. 2 is a block diagram illustrating an example system for optimizing I/O from one or more clients to a cloud storage system.
Figure 3:
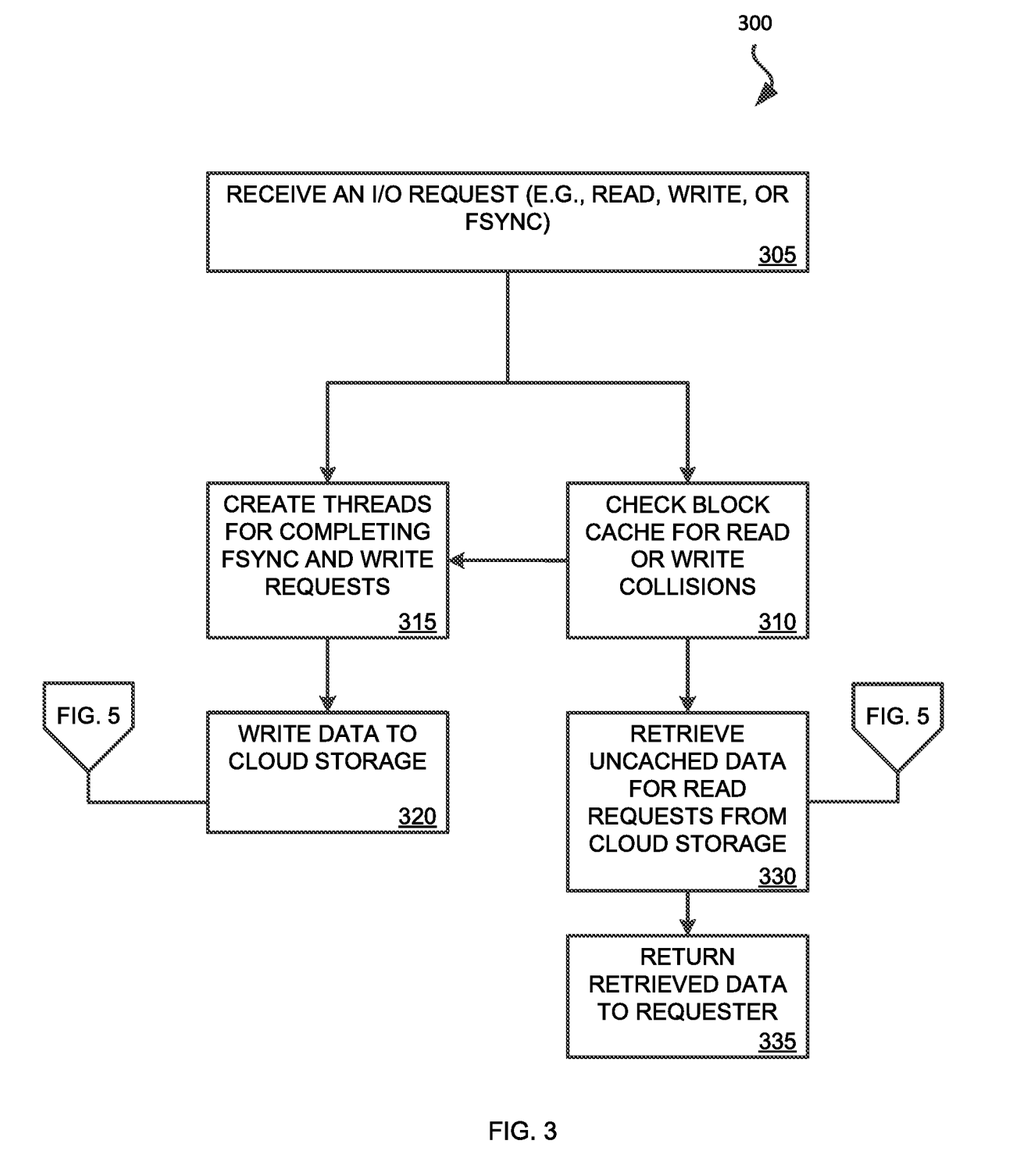
FIG. 3 is a flow diagram illustrating an example method for performing I/O from one or more clients to a cloud storage system.

FIG. 2 and FIG. 3 is a block diagram of object backing system 200 and a flow diagram of object backing method 300 respectively. In some examples, object backing system 200 of FIG. 2 can perform object backing method 300 of FIG. 3. While depicted in FIG. 1 and FIG. 2 as receiving data from a FUSE system, this is not considered limiting and it would be appreciated and understood that any properly configured file system can be architected so as to provide requests to an object backer for mediated interaction with an object storage system.

As depicted in FIG. 2, object backing system 200 includes FUSE system 202, object backer 204, object storage system 206, top layer 205, and interface layer 212. In some examples, these can be the same or similar to FUSE system 120, object backer 102, object storage system 106, top layer 108, and interface layer 110 of FIG. 1. A client or the like can send a read, write, or fsync (e.g., "file synchronize" or a command to synchronize file systems across multiple devices or services) call 203 to object backer 204 via FUSE system 202.

Top layer 205 of object backer 204 can receive the read, write, or fsync call 203 (operation 305). As in FIG. 1, FUSE system 202 can first translate or otherwise process the read, write, or fsync call 203 into a block request format compatible with object storage system 206. In some examples, multiple vendors can provide the object cloud storage service and some or all have different formats, the read, write, or fsync call 203 can be formatted into a generic block format in order to eventually be converted to one or more platform specific formats downstream.

In some examples, top layer 205 can include a dispatching service that will transmit the request to downstream services based on the nature of the request. For example, top layer 205 can transmit write check 207A to block cache 208 as a result of receiving a write call from FUSE system 202. Likewise, read check 207B can be provided to block cache 208 as a result of top layer 205 receiving a read call from FUSE system 202. In some examples, top layer 208 can receive a request including both a read call and a write call, a read call and a fsync call, a write call and a fsync call, or other combinations as will be apparent to a person having ordinary skill in the art. In such cases, top layer 205 can process each call individually as discussed below.

Block cache 208 can use write checks 207A and read checks 207B to check for collisions against currently cached data (operation 310). Where a collision is detected, the data can be returned from cache, in the case of read check 207B, rather than retrieving the data from object storage system 206 and, for example, incurring a service charge or the like. Similarly, write check 207A can indicate that the respective data has already been written to object storage system 206 and thus a redundant data write can be avoided. Furthermore, block cache 208 can validate the integrity of a block prior to writing in order to protect against corruption of data stored on object storage system 206. Various caching algorithms can be used to determine which data is preserved in block cache 208 and for how long. In some examples, an administrator can set a cache policy for block cache 208.

If read check 207B detects the sought data in block cache 208, that data is returned to the caller directly from block cache 208. However, if block cache 208 does not contain a copy of the sought data of read check 207B, read call 209B can be passed on to object storage system 206 in order to retrieve the uncached data from object storage system 206 (operation 330). Having retrieved the data from object storage system 206, object backer 204 can return the retrieved data to requesting FUSE system 202 (operation 335).

Object backer 204 can create running background threads 210 from fsync calls 207C or write calls 209A (operation 315). Background threads 210 can be created in response to write call 209A received from block cache 208 following validation and collision checks. In comparison, fsync call 207C produced by top layer 205 can initiate the creation of new background threads 210.

Nevertheless, each background thread of background threads 210 can be associated with particular write operations transmitted as write calls 211 to object storage system 206 (operation 320). Fsync calls 207C will initiate one or more threads for writing copies of data stored on FUSE system 202 that is absent from object storage system 206. In some examples, object backer 204 can also update modified data by writing over the unmodified version of the data stored on object storage system 206 with the modified version of the same data provided by FUSE system 202. In some other examples, new blocks that are otherwise similar to the unmodified version of the block save for the data sought to be modified can be provided to the object storage system 206, which will then delete the block including the unmodified version of the data.

In some examples, write calls 211 and read calls 209B can be passed through interface layer 212 prior to being received by object storage system 206. Interface layer 212 can format the calls in order to comply with object storage system 206 interface requirements u sing a device translation service 215. Device translation service 215 can include multiple translation services and associated libraries, APIs, and the like for converting device independent I/O calls to a device dependent protocol as discussed above in reference to device translation service 124. For example, object storage system 206 can require a Hypertext Transfer Protocol ("HTTP") format such as "PUT" or "GET" requests in order to interface with object storage system 206 through a particular Representational State Transfer Application Programming Interface ("RESTful API"). Other formats can be used to interface with other or multiple object storage systems and interface layer 212 can format write calls 211 and read calls 209B accordingly.

Figure 5:
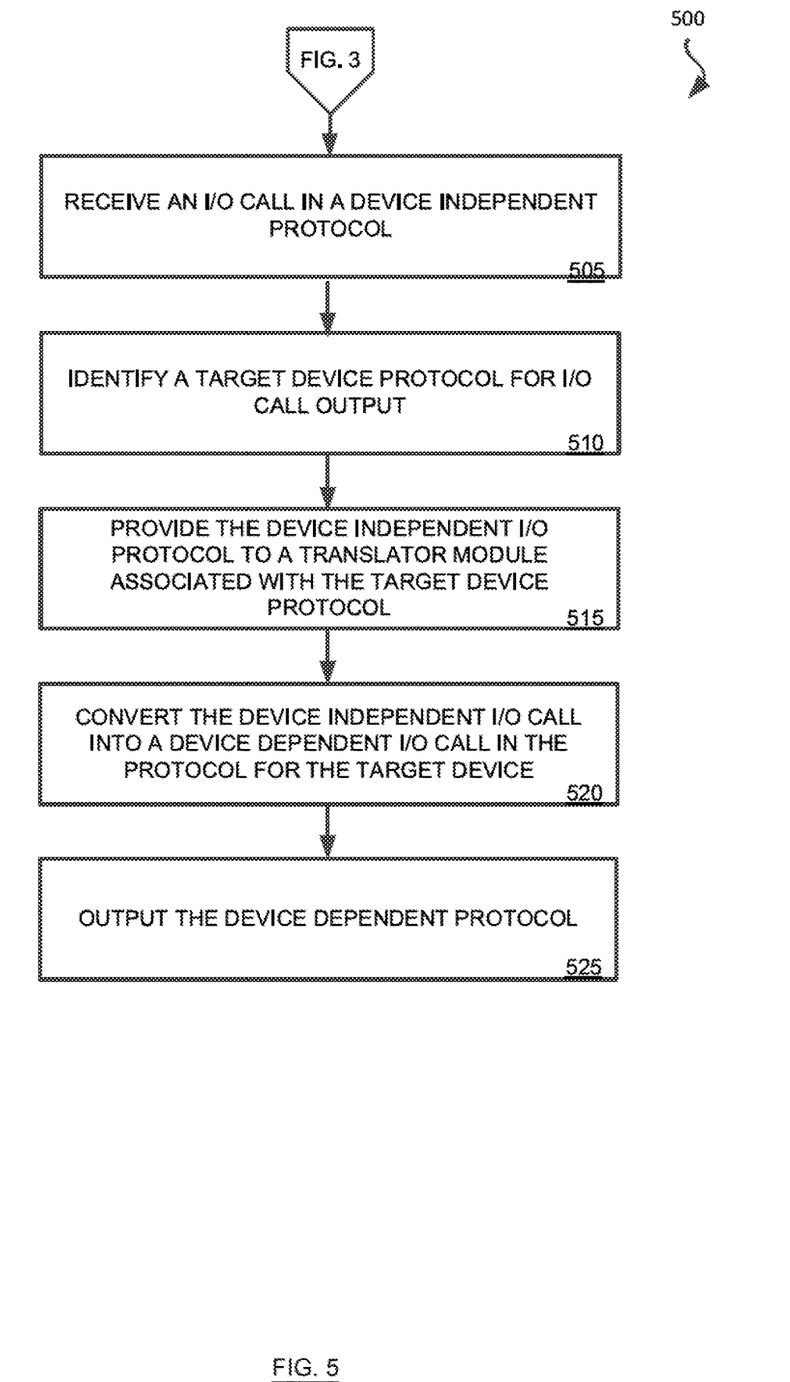
FIG. 5 is a flow diagram illustrating an example method for generating an I/O call.

FIG. 5 depicts method 500 for converting device independent write call 211 or read call 209B into a device dependent protocol (e.g., a protocol associated with a particular object storage system 206 such as AWS S3, S3 compatible, Azure Blob, Swift, and the like). Method 500 can be performed by device translation service 215, for example, through one or more device drivers (not depicted). The device drivers can be dynamically linked DLLs, statically linked, or a combination of the two.

Device translation service 215 can receive an I/O call (e.g., for a read as in read call 209B or a write as in write call 211) in a device independent protocol (operation 505). For example, I/O operations can be maintained within object backer 204 in a basic protocol prior to formatting by device translation service 215. In some examples, the device translation service can receive write call 209A in order to format the write call into a device dependent protocol prior to being maintained in background threads 210 for eventual transmission to object storage system 206.

Device translation service 215 can then identify a target device protocol for translation (operation 510). In some examples, device translation service 215 can use, in some examples, a preconfigured lookup table to match, for example, an Internet Protocol ("IP") address to a particular provider of object storage system 206. The IP address can be provided by the received I/O call as a destination address. In some other examples, device translation service 215 can determine the target device protocol based on a Domain Name Service ("DNS") lookup result. Metadata, for example, contained with the received device independent I/O call can be used to perform a DNS lookup. In other examples, device translation service 215 can be preconfigured to translate to a predetermined target protocol.

Once a target device protocol has been identified, device translation service 215 can provide the received device independent I/O call to a translator associated with the target device protocol (operation 515). The translator can be a device driver as discussed above and can be either dynamically linked or statically linked. The translator can convert from the device independent protocol to the target device protocol by replacing device independent protocol I/O call content, adding new content to the device independent protocol I/O call, removing content from the device independent protocol I/O call, or a combination of the three.

The translator of device translation service 215 can then convert the received device independent I/O call into an I/O call adhering to the target device protocol (operation 520). The translated device dependent I/O call may then be output to, for example, object storage system 206 (operation 525). While depicted here as processing I/O calls output by background threads 210, it is understood that device translation service 215 can, in some examples, intercept fsync calls 207C, write calls 209A, and read calls 209B before they are received by background threads 210 or other services. In this case, device translation service 215 can then output translated I/O calls to backgrounds threads 210. In some examples, method 500 can be performed for multiple I/O calls processed by object backer 204. In such cases, different target device protocols can be identified for each I/O call and thus background threads 210 can include I/O calls in different respective device dependent protocols (e.g., two I/O calls in the first device independent protocol may be translated in the one case to a second protocol associated with a target device such as AWS and in the other case to a third protocol associated with a target device such as Azure Blob).

Returning to FIG. 2, interface layer 212 can also receive and process service responses 214 from object storage system 206. For example, and without imputing limitation, object storage system 206 can return a slowdown error message 600 or 603 denoting a need to reduce the number of write or read calls sent to object storage system 206. Interface layer 212 can relay service response 214 information to top layer 205. In some examples, interface layer 212 can aggregate service responses 214 and provide to top layer 205 service data 216 in the form of statistical information such as, for example, number of 603 responses within a certain amount of time or over the course of a certain number of transmitted write calls 211.

Top layer 205 can process service data 216 from interface layer 212 to determine optimal write speeds for background threads 210 (detailed below in reference to FIG. 4). Furthermore, the top layer can synchronize (e.g., maintain parity across) background threads 210 through sending control data 218 to background threads 210. In some examples, top layer 204 can further synchronize read checks 207B and resultant read calls 209B with background threads 210 in order to maintain a uniform and consistent rate of interfacing with object storage system 206. In some other examples, read calls 209B can be managed by background threads 210 and so can be synchronized through control data 218 (not depicted). In some examples, top layer 205 can manage background threads 210 using provided published data (not depicted) in addition to or instead of service data 216 provided by interface layer 212.

Figure 4:
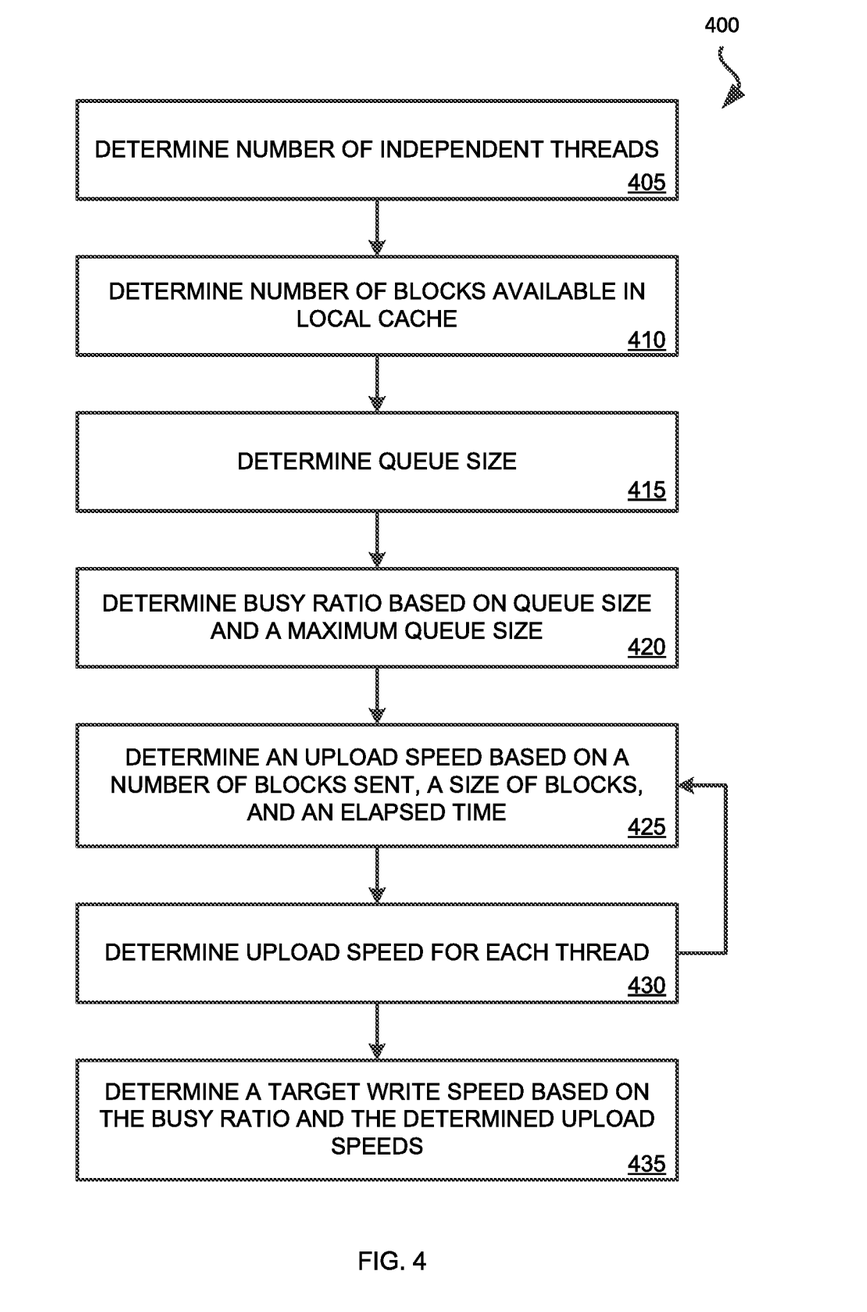
FIG. 4 is a flow diagram illustrating an example method for determining an optimal flow for I/O from one or more clients to an object storage system.

Background threads 210 and associated write calls 211 can be managed according to the process depicted in FIG. 4, which can be performed by top layer 205 or a separate management process or service (not depicted). FIG. 4 illustrates a flow diagram of an example method for determining an optimal flow for I/O from one or more clients to an object storage system. The method of FIG. 4 is provided by way of example, as there are a variety of ways to carry out the method. Additionally, while the example of method 400 is illustrated with a particular order of s, those of ordinary skill in the art will appreciate the method of FIG. 4 and the s illustrated therein can be executed in any order that accomplishes the technical advantages of the present disclosure and can include fewer or more s than illustrated. Each shown in FIG. 4 can represent one or more processes, methods, or subroutines, carried out in example method 400. The s illustrated in FIG. 4 can be implemented in system 100 illustrated in FIG. 1 and system 200 illustrated in FIG. 2. In particular, background threads 210 can implement method 400 to optimize interactions with object storage system 206.

A number of independent threads can be determined by, for example, top layer 205 by querying background threads 210 (operation 405). For example, the number of independent threads of background threads 210 managing write calls 211 to object storage system 206. Each thread can be associated with one or more particular write calls 211.

The number of blocks available in local cache (e.g., block cache 109, 208) can be determined by, for example, top layer 205 (operation 410). In some examples, the number of blocks can be configurable by an administrator (e.g., via command line). The local storage of blocks (e.g., bucket_file) can enable some blocks to be burst written. For example, when one or more blocks are burst written, the entirety of the block or blocks will be transferred to object storage system 206 as single write call 211.

Furthermore, a queue size can be determined (operation 415). For example, a queue size for a queue including the content of block cache 109, 208 can be determined by the number of independent threads and a threshold amount. For example, if the number of independent threads is 10 and the threshold amount is 20, block cache 208 can have at most 200 blocks in queue (e.g., waiting to be transmitted to object storage system 206).

Interface layer 110 can then determine a busy ratio based on, for example, a current size of the queue and a maximum queue size (operation 420). The busy ratio can be a percentage from 0 to 100. The percentage can be a ratio between the queue size (e.g., the number of blocks waiting in line to be sent) and the maximum queue size. The two values can be lowered by a minimum threshold. In some examples, the minimum threshold can be configured by an administrator or the like. In some examples, the busy ratio can be used to slow down the writes (e.g., by top layer 108). For example, writes do not need to be altered (e.g., slowed down) when the busy level is low. That is, writes can be at a faster speed until block cache 109, 208 is full (e.g., or close to full), thus providing fast processing of small write calls and slowing down client 104 when a large write call is requested which would otherwise fill block cache 109, 208.

An upload speed can further be determined (operation 425). For example, interface layer 110 can determine the upload speed by multiplying the number of blocks sent by the block size and dividing by the time elapsed. Upload speeds for each independent thread of background threads 210 can be determined using the operations discussed above (operation 430).

A target write speed can then be determined based on the upload speeds and other information such as, for example, service data 211 (operation 435). The target write speed can be a speed of I/O (e.g., read and write operations) which will not result in an error. For example, top layer 108 can determine the target write speed based on the busy ratio and the upload speed. In some examples, there can be different levels of busy level used to determine the target write speed. For example, when the busy speed is greater than a predetermined threshold amount, the upload speed can be limited by a predetermined amount. An example, table can be seen below:

```
If (busy_level > 95){
    priv->target_speed_MBps = pld.est_speed * 0.8;
} else if (busy_level > 90){
    priv->target_speed_MBps = pld.est_speed * 0.9;
} else if (busy_level > 80){
    priv->target_speed_MBps = pld.est_speed * 0.999;
} else if (busy_level > 60){
    priv->target_speed_MBps = pld.est_speed * 1.01;
} else if (busy_level > 40){
    priv->target_speed_MBps = pld.est_speed * 1.5;
} else if (busy_level > 10) {
    priv->target_speed_MBps = pld.est_speed * 1.9;
} else {
    //go at full throttle, we are empty.
    priv->target_speed_MBps = MAX_SPEED;
}
```

As can be seen in the table above, when the busy level is high, top layer 108 will slow down the upload speed. For example, when the busy level is 90% then the top layer will impose a limit of 90% (e.g., 0.9) of the estimated upload speed (e.g., to drain the queue of blocks). Alternatively, when the busy level is low (less than 10%) then top layer 108 will not impose any limit and will collect blocks at the maximum speed possible (e.g., MAX_SPEED) without any imposed delay.

Figure 6A:
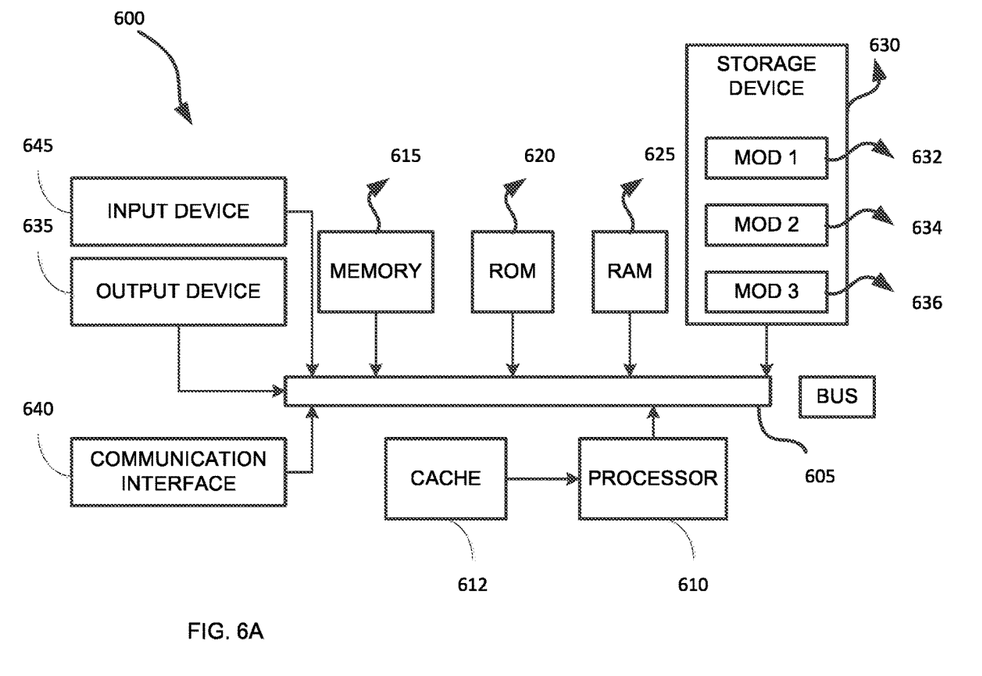
FIGS. 6A and 6B show example systems for implementing various embodiments of the present technology.
Figure 6B:
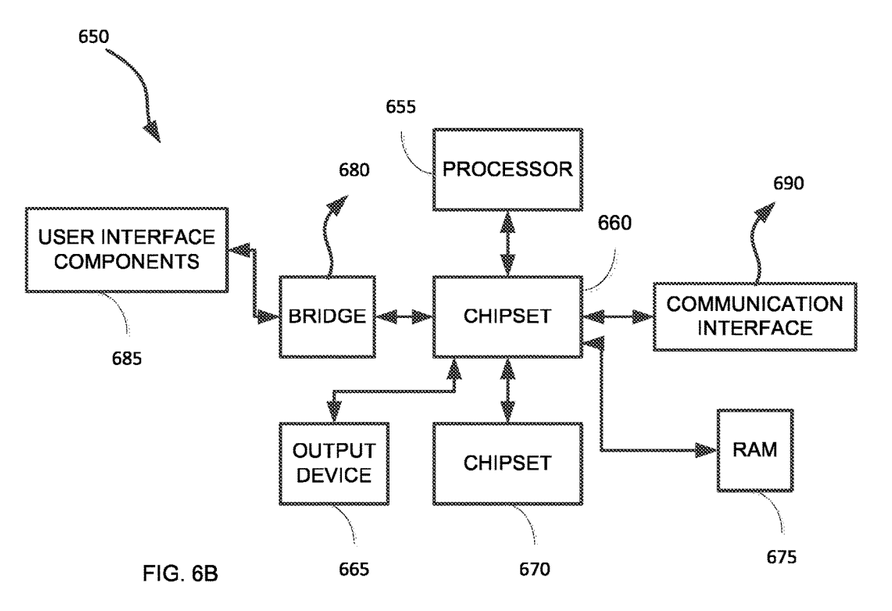

FIG. 6A and FIG. 6B show example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using bus 605. System 600 includes a processing unit (CPU or processor) 610 and system bus 605 that couples various system components including system memory 615, such as read only memory (ROM) 620 and random access memory (RAM) 625, to processor 610. System 600 can include a cache of high-speed memory connected directly with, in close proximity to, or integrated as part of processor 610. System 600 can copy data from memory 615 and/or storage device 630 to cache 612 for quick access by processor 610. In this way, the cache can provide a performance boost that avoids processor 610 delays while waiting for data. These and other modules can control or be configured to control processor 610 to perform various actions. Other system memory 615 can be available for use as well. Memory 615 can include multiple different types of memory with different performance characteristics. Processor 610 can include any general purpose processor and a hardware module or software module, such as module 1 632, module 2 634, and module 3 636 stored in storage device 630, configured to control processor 610 as well as a special-purpose processor where software instructions are incorporated into the actual processor design. Processor 610 can essentially be a completely self-contained computing system, containing multiple cores or processors, a bus, memory controller, cache, etc. A multi-core processor can be symmetric or asymmetric.

To enable user interaction with computing device 600, input device 645 can represent any number of input mechanisms, such as a microphone for speech, a touch-sensitive screen for gesture or graphical input, keyboard, mouse, motion input, speech and so forth. Output device 635 can also be one or more of a number of output mechanisms known to those of skill in the art. In some instances, multimodal systems can enable a user to provide multiple types of input to communicate with computing device 600. Communications interface 640 can generally govern and manage the user input and system output. There is no restriction on operating on any particular hardware arrangement and therefore the basic features here can easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 can include software modules 632, 634, 636 for controlling processor 610. Other hardware or software modules are contemplated. Storage device 630 can be connected to system bus 605. In one aspect, a hardware module that performs a particular function can include the software component stored in a computer-readable medium in connection with the necessary hardware components, such as processor 610, bus 605, display 635, and so forth, to carry out the function.

FIG. 6B illustrates computer system 650 having a chipset architecture that can be used in executing the described method and generating and displaying a graphical user interface (GUI). Computer system 650 is an example of computer hardware, software, and firmware that can be used to implement the disclosed technology. System 650 can include processor 655, representative of any number of physically and/or logically distinct resources capable of executing software, firmware, and hardware configured to perform identified computations. Processor 655 can communicate with chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. Bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that systems 600 and 650 can have more than one processor 610 or be part of a group or cluster of computing devices networked together to provide greater processing capability.

For clarity of explanation, in some instances the present technology can be presented as including individual functional blocks including functional blocks comprising devices, device components, or routines in a method embodied in software, or combinations of hardware and software.

Any of the steps, operations, functions, or processes described herein can be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method s, it is to be understood that the subject matter defined in the appended claims is not necessarily limited to these described features or acts. For example, such functionality can be distributed differently or performed in components other than those identified herein. Rather, the described features and are disclosed as examples of components of systems and methods within the scope of the appended claims.

The invention claimed is:

1. A method for performing I/O on a storage system, the method comprising:
receiving, at a device, an I/O request to the storage system using a first protocol;
translating the I/O request to a second protocol, wherein the second protocol is specific to the device;
queuing the I/O request in a local block cache;
determining a busy ratio by:
determining, via a top layer of an object backer of the storage system, a number of blocks available in the local block cache;
querying, via the top layer of the object backer, a plurality of background threads running in the storage system, and determining, based on the query, a number of independent threads identified from the background threads as currently managing write calls to the storage system;
calculating a maximum queue size for the local block cache, the calculating comprising multiplying the number of blocks by the number of independent threads identified from the background threads as currently managing write calls to the storage system; and
calculating the busy ratio based on a current size of the queue and the calculated maximum queue size for the local block cache;
determining an I/O speed from the device to the storage system, the I/O speed based at least in part on the busy ratio and an upload speed, wherein the I/O speed does not exceed a current speed of the storage system; and
executing, at the device, the I/O request to the storage system at the I/O speed.

2. The method of claim 1, wherein the second protocol is one of AWS S3, S3 compatible, Azure Blob, or Swift.

3. The method of claim 1, further comprising translating a second I/O request from the first protocol to a third protocol.

4. The method of claim 1, wherein the translation is performed by a statically linked device driver translator.

5. The method of claim 1, wherein the translation is performed by a dynamically linked device driver translator.

6. The method of claim 1, further comprising identifying the second protocol based on one of an IP address and a DNS lookup of the storage system.

7. The method of claim 1, further comprising determining a number of independent threads, wherein the independent threads perform I/O operations between the device and an object storage system.

8. The method of claim 7, further comprising:
determining an upload speed for each independent thread; and
synchronizing executions of I/O operations across the independent threads.

9. The method of claim 1, wherein the object storage system is a cloud-based storage system.

10. The method of claim 1, wherein the busy ratio is calculated by dividing the queue size by a maximum queue size.

11. The method of claim 1, wherein the upload speed is determined by multiplying a number of blocks sent by a block size and dividing by an elapsed time.

12. The method of claim 1, wherein the upload speed is limited based on a percentage of the busy ratio.

13. The method of claim 12, wherein the upload speed is inversely proportional to the percentage value of the busy ratio.

14. A system for performing I/O on a storage system, the system comprising:
one or more processors; and
a memory, the memory comprising instructions which, when executed by the one or more processors, cause the one or more processors to:
receive an I/O request to the storage system using a first protocol;
translate the I/O request to a second protocol, wherein the second protocol is specific to the device;
queue the I/O request in a local block cache;
determine a busy ratio by:
determining, via a top layer of an object backer of the storage system, a number of blocks available in the local block cache;
querying, via the top layer of the object backer, a plurality of background threads running in the storage system, and determining, based on the query, a number of independent threads identified from the background threads as currently managing write calls to the storage system;

calculating a maximum queue size for the local block cache, the calculating comprising multiplying the number of blocks by the number of independent threads identified from the background threads as currently managing write calls to the storage system; and calculating the busy ratio based on a current size of the queue and the calculated maximum queue size for the local block cache;

determine an I/O speed to the storage system, the I/O speed based at least in part on the busy ratio and an upload speed, wherein the I/O speed does not exceed a current speed of the storage system; and execute the I/O request to the storage system at the I/O speed.

15. The system of claim 14, wherein the second protocol is one of AWS S3, S3 compatible, Azure Blob, or Swift.

16. A non-transitory computer readable medium storing instructions, which when executed by one or more processors, causes the one or more processors to:

receive an I/O request to the storage system using a first protocol;

translate the I/O request to a second protocol, wherein the second protocol is specific to the device;

queue the I/O request in a local block cache;

determine a busy ratio by:

determining, via a top layer of an object backer of the storage system, a number of blocks available in the local block cache;

querying, via the top layer of the object backer, a plurality of background threads running in the storage system, and determining, based on the query, a number of independent threads identified from the background threads as currently managing write calls to the storage system;

calculating a maximum queue size for the local block cache, the calculating comprising multiplying the number of blocks by the number of independent threads identified from the background threads as currently managing write calls to the storage system; and calculating the busy ratio based on a current size of the queue and the calculated maximum queue size for the local block cache;

determine an I/O speed to the storage system, the I/O speed based at least in part on the busy ratio and an upload speed, wherein the I/O speed does not exceed a current speed of the storage system; and execute the I/O request to the storage system at the I/O speed.

* * * * *